United States Patent [19]

Whitman

[11] 3,919,562

[45] Nov. 11, 1975

[54] SLIT DETECTOR FOR OPTICAL DETECTOR SYSTEM

[75] Inventor: Robert L. Whitman, Oak Park, Ill.

[73] Assignee: Zenith Radio Corporation, Chicago, Ill.

[22] Filed: May 20, 1974

[21] Appl. No.: 471,396

[52] U.S. Cl. ... 250/570; 179/100.3 G; 179/100.3 V

[51] Int. Cl.² .......... G06K 7/10

[58] Field of Search .......... 179/100.3 G, 100.3 V, 179/100.4 M, 100.41 L, 6.7 A, DIG. 28; 250/550, 570, 237 R, 237 G

[56] References Cited

UNITED STATES PATENTS

| | | | |
|---|---|---|---|
| 3,654,401 | 4/1972 | Dickopp et al. | 179/100.3 V |
| 3,716,286 | 2/1973 | St. John et al. | 179/100.3 G |
| 3,764,759 | 10/1973 | Herriger et al. | 179/100.4 M |
| 3,796,498 | 3/1974 | Post | 250/237 G |
| 3,812,352 | 5/1974 | MacGovern | 250/237 G |
| 3,818,148 | 6/1974 | Dickopp | 179/100.41 L |

*Primary Examiner*—James W. Lawrence
*Assistant Examiner*—D. C. Nelms
*Attorney, Agent, or Firm*—Cornelius J. O'Connor

[57] ABSTRACT

An optical system for detecting a time-varying signal spatially recorded upon a disc as a light diffraction grating in the form of a spiral track. The disc is driven, relative to a reading spot to develop a time-varying diffraction pattern comprising at least a zero order, +1 order and a −1 order. An aperture, having a dimension in the direction of the track which is less than one-half the distance across which the zero order is distributed, is positioned in the far field of the diffraction pattern near the boundary of the zero order. A photodetector positioned adjacent the aperture derives an electrical signal representative of the signal spatially recorded on the disc.

6 Claims, 10 Drawing Figures

SLIT DETECTOR FOR OPTICAL DETECTOR SYSTEM

This invention relates in general to an arrangement for optically detecting recorded information. More particularly, the invention concerns an optical system, characterized by an increased depth-of-focus, for detecting time dependent information signals which have been spatially recorded upon a disc.

BACKGROUND OF THE INVENTION

One approach to recording video information upon a disc contemplates converting the instantaneous amplitude of the video signal to a corresponding frequency modulation of a carrier which has a frequency at least twice that of the highest information signal. In a system of the type herein to be considered, the recorded video information to be detected can include signals approaching 3.5MHz, thus necessitating a carrier of at least 7.0MHz. This modulated carrier is recorded upon the disc as an elongated spiral track, which track may take the form of an undulating groove or, alternatively, a train of markings. In the first mentioned case, discs are made from a master upon which a track is mechanically cut by a stylus, using known techniques, to produce a groove within which the video information is impressed, for example, as a hill and dale contour. Alternatively, photographic techniques may be employed to create a master from which discs are pressed having information stored in a track formed as a train of cavities or pits. In any event, the resulting track is characterized by a construction in which the frequency modulated carrier is physically represented by the spatial frequencies of hills and dales, or by the spatial frequencies of the pits.

The retrieval of video information stored upon a disc poses a number of problems not the least of which concerns the signal detection apparatus. In practice, the disc is driven or flown, at a high speed, e.g., 1800 rpm, past a track monitor. The information carried by a grooved disc is usually recovered by monitoring the groove with a stylus which is coupled to a piezoelectric device that derives an electrical signal corresponding to the original frequency modulated carrier. The information stored in a train of pits, on the other hand, is retrieved by addressing the track with a beam of light and then reading the light transmitted through the disc, or reflected therefrom, with a light detector. In this case the light detector serves as a generator which develops an electrical signal that corresponds to the frequency modulated carrier. It should also be appreciated that the information stored in a grooved disc can be retrieved by optical signal detection techniques by monitoring a light beam reflected from the groove. In any event, the derived electrical signal is then processed through an FM discriminator or a ratio detector in order to extract the original information signal.

In current optical detection practice the electrical signal is derived by focusing the light of a laser beam to form a reading spot for addressing the track. The required size of the spot is dictated by the spatial wavelength of the highest recorded signal, i.e., the cross-section of the beam, in the direction of the track cannot be larger than the wavelength of the highest frequency recorded. By way of example, the light spot required to read a spatially recorded 7 MHz carrier at a 3 inch disc radius would have a diameter of approximately 1 micron, in other words, a spot small enough to resolve the spatial frequency of a 7MHz frequency modulated carrier. As will be shown employing a spot of such minute size imposes severe requirements on the playback machine because vertical excursions of that portion of the disc presented to the reading spot must be restricted to a very narrow range since the depth of focus of an optical system capable of resolving a spatially recorded video signal is of necessity exceedingly shallow.

The significance of depth-of-focus can best be appreicated when it is realized that the depth-of-focus of an illuminating spot capable of resolving the spatial frequency of a 7MHz carrier at a disc radius of 3 inches is about 15 microns. In other words, a utilizable light signal can be derived by a photodetector only so long as the track portion of the record surface under scansion does not depart more than 7½ microns, in either direction, from the spot's focal point. Accordingly, when the disc is flown, any thickness variations of the disc or any disturbance which tends to cause the disc to depart more than 7½ microns from its intended plane of rotation, particularly in that region where the disc is being scanned by the light spot, will cause the track portion under scansion to be displaced to a point beyond the usable range of the spot's depth-of-focus. As a result, retrieval of information is interrupted or, at least, severely degraded. To combat this problem the art contemplates, in one approach, aerodynamic stabilizers which exert stabilizing forces over that area of the disc immediately under scansion. However, since such a stabilizer is a relatively precise and thus expensive component, the playback machine is burdened with a significant cost factor.

OBJECTS OF THE INVENTION

Accordingly, it is a general object of the invention to provide a new and improved optical detection system for retrieving information stored upon a video disc.

It is a specific object of the invention to provide an optical detection system in which the depth-of-focus of the optical pickup is effectively increased.

It is also an object of the invention to provide an optical detection system which effects a significant economy in the optical pickup apparatus of a video playback machine.

SUMMARY OF THE INVENTION

An optical system for detecting a time-varying signal which has been spatially recorded upon a disc to form a light diffraction grating in the shape of a spiral track comprises means for supporting the disc, means, including a laser beam, for producing a beam of light and means for focusing the laser beam to derive a reading spot having a dimension in the longitudinal direction of the track which is less than the wavelength of the highest spatial frequency recorded on the disc. Drive means for displacing the disc, relative to the reading spot, at a predetermined velocity are provided to effect a scan of the track and thereby develop a time-varying diffraction pattern of the spot. The aforesaid diffraction pattern comprises at least a zero order, +1 order and a −1 order with each of said orders having a distribution parallel to the longitudinal direction of the track. An aperture, having a dimension in the direction of the track which is less than one-half the distance across which the zero order is distributed, is positioned in the far field of the diffraction pattern near the boundary of the zero order for transmitting at least a portion of the zero order diffraction pattern. Finally, light responsive means are positioned adjacent the aperture for deriving, in response to illumination by that portion of the diffraction pattern transmitted by the aperture, an electrical signal representative of the signal spatially recorded on the disc.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Prior to commencing discussion of the invention it should be noted that the illustrations of portions of the disclosed optical detection system, as well as certain explanatory diagrams, have been intentionally exaggerated in order to facilitate the presentation and understanding of the invention.

Figures 1, 2, 6A, 6B, 6C, 7A, 7B:
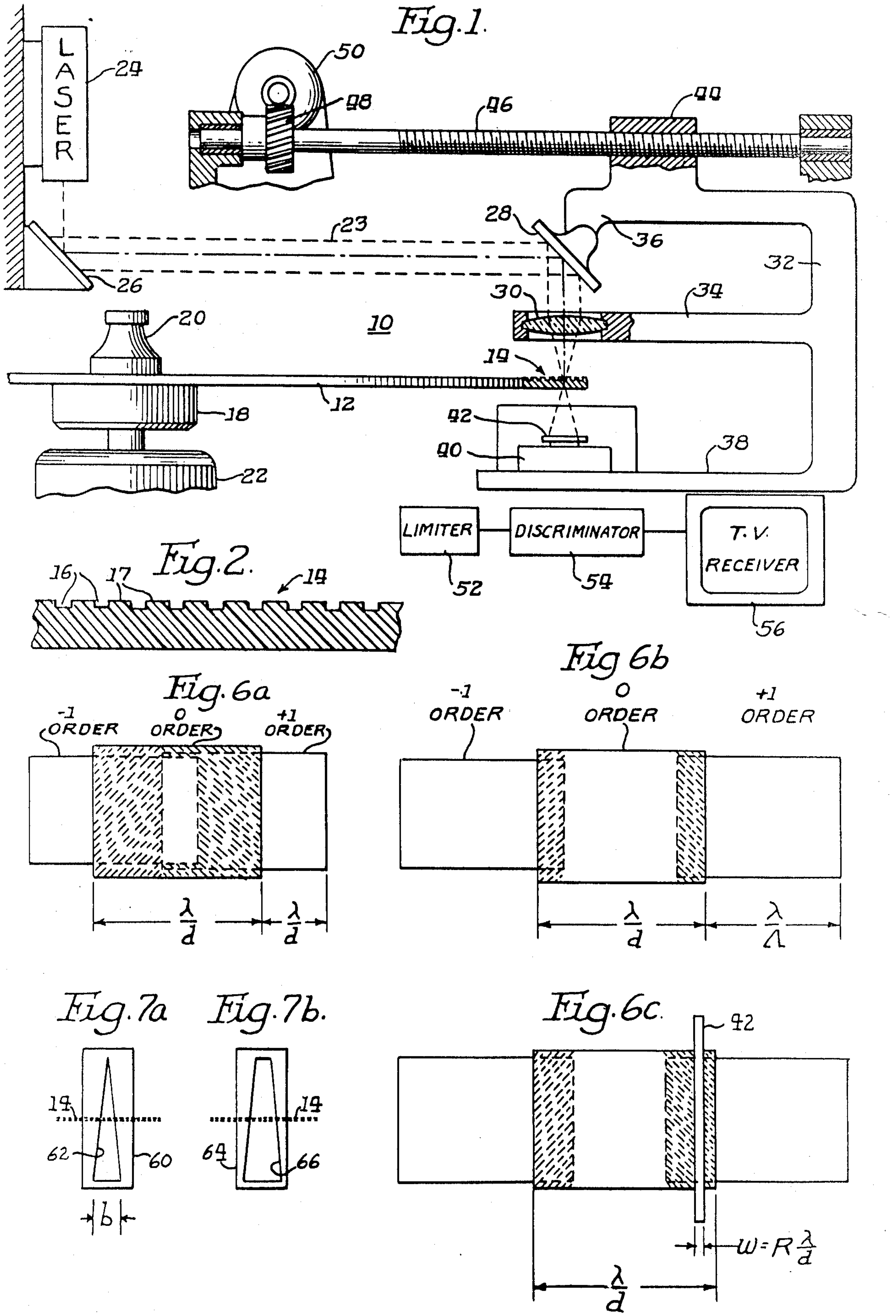
FIG. 1 is a fragmentary elevational view of an optical video detecting system.
FIG. 2 is a cross-sectional view of a portion of a video disc as viewed along lines 2—2 in FIG. 1 and detailing part of a longitudinal section of a spatially recorded track.
FIGS. 6*a*, 6*b* and 6*c* illustrate portions of overlapping beam diffraction patterns helpful to an understanding of the invention.
FIGS. 7*a* and 7*b* depict alternative constructions for a light detector aperture.

Accordingly, and as will be shown, the optical playback system 10 depicted in FIG. 1 serves to detect time dependent information signals, for example, video signals, which have been converted to a frequency modulated carrier and spatially recorded upon the surface of a storage medium, such as a disc 12, which disc preferably comprises a thin foil of polyvinyl chloride. The particular manner in which the information signal is recorded upon the disc is of no concern in that resort may be had to either the mechanical or photographic techniques adverted to above. For purposes of discussion it will be assumed that the recorded information adopts the shape of an elongated spiral track 14 comprising a train of pits 16, interspersed with lands 17, impressed in the upper surface of disc 12; a longitudinal section through a portion of a track is shown in FIG. 2.

This track, or train of pits and lands, forms a light diffraction grating which is physically manifested as a spatial pattern formed on the surface of the disc and representative of the modulated carrier signal. This spatial pattern can be said to be established by the totality of the pits forming the track with the spacing, for example, between adjacent pits corresponding to an instantaneous frequency of the modulated carrier.

An approach to optically detecting information stored upon a disc contemplates monitoring the track with a beam of coherent light. The beam is converged by an optical focusing apparatus having a relatively high numerical aperture (NA) so that the illuminating or reading spot derived therefrom is of such a minute dimension as to be capable of resolving the highest spatial frequency of the recorded modulated carrier. In other words, the spot must be able to analyze increments of the carrier signal as represented by a pit. Of necessity, an optical system of such capability is characterized by an extremely small depth of focus (DF) which is another way of saying that the range within which the spot remains in focus is very shallow.

Turning now to the structural details of system 10, as shown in FIG. 1 disc 12 is supported upon the spindle 18 of a playback deck and secured thereon by a cap 20. The lower extremity of the spindle is coupled to a synchronous motor 22 which serves to rotate the disc at a predetermined velocity. In order to read track 14, optical detection system 10 utilizes a beam 23 of monochromatic coherent light which is produced by a laser 24. The laser may be positioned at any convenient location since the beam therefrom can be directed by the mirrors 26, 28 to the focusing means, specifically, the objective lens 30. Lens 30 has a numerical aperture which is such that the illuminating spot produced by it is small enough to resolve the highest spatial frequency recorded on the disc. In other words, the dimension of the spot, in the longitudinal direction of the track, is less than the wavelength of the highest spatial frequency desired to be detected. Thus, it is small enough to detect the individual pits representative of the highest modulated carrier frequency.

To enable the spot produced by the lens to monitor track 14, lens 30 and mirror 28 are supported upon a carriage 32 for conjoint travel along a path normal to the track and thus coincident with a radius extending from the center of the disc. As shown in FIG. 1, lens 30 is supported by an arm 34 while mirror 28 depends from an upper frame member 36 of the carriage. A lower frame member 38 of the carriage supports a light responsive means such as a photodetector 40, as well as an aperture 42 which takes the form of a flat member having an elongated opening. Preferably, the aperture opening comprises a rectangular slit, although other non-circular openings can be employed. The aperture is positioned in the far field of the diffraction pattern developed when track 14 is illuminated by beam 23, the generation of which pattern will be discussed in detail below. The aperture, which serves to determine the amount of photodetector surface area that is exposed to the light passing through the disc, is oriented so that the longitudinal dimension of the slit is perpendicular to track 14. Frame member 38 is arranged so as to position photodetector 40 and aperture 42 immediately below lens 30 but sufficiently spaced therefrom to permit passage of disc 12.

To facilitate a controlled radial displacement of the optical reading apparatus, carriage 32 includes a housing portion 44 which threadably receives a rotatably mounted lead screw 46. The lead screw is effectively oriented perpendicular to track 14 of the disc to assure accurate radial travel of lens 30 and light detector 40, 42. A pinion 48, fitted to one end of the lead screw, couples the lead screw to a driver 50 which can comprise an electric motor and gearing complex arranged to coordinate the radial displacement of the carriage with the rotational speed of the disc.

When drive motor 22 is energized to rotate disc 12, relative to the light spot, motor 50 is simultaneously energized to effect a controlled inward radial displacement of the objective lens 30 and the photodetection elements 40, 42, thus effecting a scan of track 14. As the diffraction grating forming track 14 passes beneath the reading spot, a series of time-varying beam diffraction components are developed by virtue of the diffracting action of the track pits upon the beam spot. Effectively, the action of the pits and lands upon the light beam, as they pass through the scansion region, is tantamount to passing a series of converging and diverging lenses under the light to generate the aforesaid diffraction pattern. The resulting pattern can be pictorially represented in the manner shown in FIGS. 3 and 4. In addition to the zero order, there are the +1 order and −1 order fan-shaped patterns shown in FIGS. 3 and 4, each of which orders has a distribution parallel to the longitudinal direction of the track. Although FIG. 4 suggests that the zero order is larger than the other two, actually all the orders present approximately the same profile. The zero order is intentionally made larger in order than the overlap regions and the boundaries of the orders are more readily discernible. As shown, and pursuant to the inventive teaching, aperture 42 is positioned in the far field of the diffraction pattern near the boundary of the zero order and within its overlap with the +1 order. The width of the slit in aperture 42, that is, its dimension paralleling the longitudinal direction of the track, is less than one-half the distance across which the zero order is distributed. Stated in another way, the width of the slit subtends and angle which is less than one-half the divergence angle of the zero order. While the slit can be positioned anywhere within the zero order, it is preferred that the slit be located at the extreme edge of the zero order to insure that the highest recorded spatial frequencies can be detected since the widest divergence of the diffracted orders is attributable to the highest frequencies. In other words, the extent of divergence of the +1 and −1 orders is a function of the recorded spatial frequencies with the highest frequencies producing the greatest divergence.

In each of the overlap regions a form of heterodyning or mixing takes place in that the zero order and the +1 order (or the −1 order) beat or flicker at a rate that corresponds to the frequency of the signal spatially recorded on the track. It is the function then of photodetector 40 to derive, in response to the flickering illumination transmitted through aperture 42, an electrical signal representative of the time-varying signal spatially recorded on the track. This derived signal, which is a replica of the frequency modulated carrier recorded on the disc, is coupled through a limiter 52 to a discriminator 54 wherein it is demodulated. The output of the discriminator is then coupled to a television receiver 56 which reconstitutes the program recorded on the disc.

Figure 3:
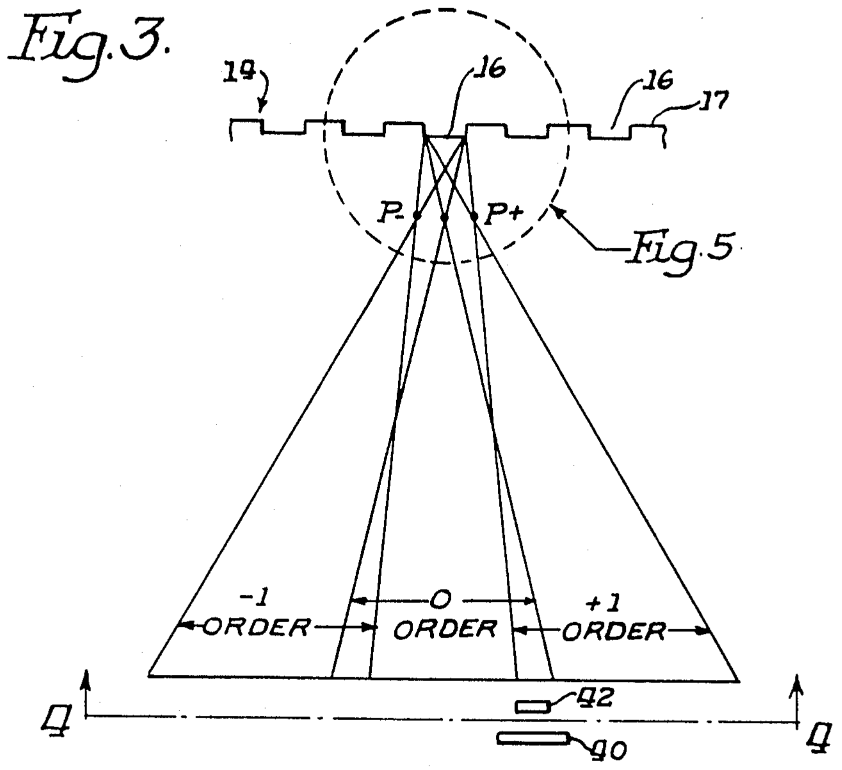
FIG. 3 is a schematic representation of a light beam diffraction pattern.
Figure 4:
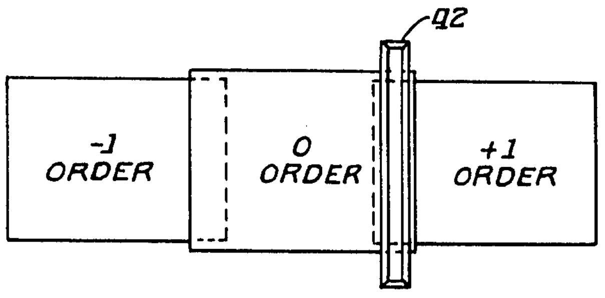
FIG. 4 is a schematic representation of the beam diffraction pattern taken along lines 4—4 of FIG. 3.
Figure 5:
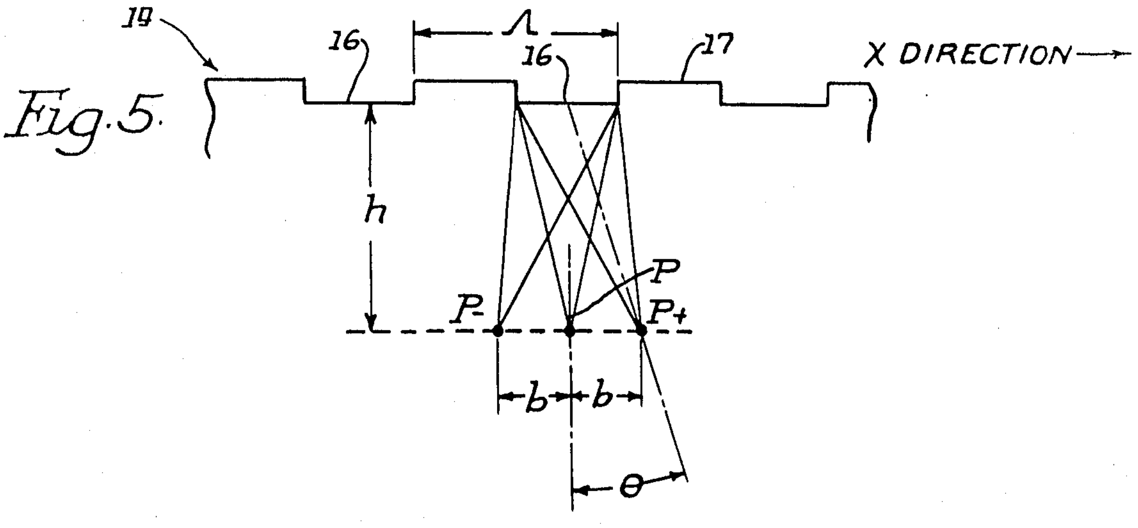
FIG. 5 is an enlarged view of the circled section in FIG. 3 constituting an analysis of a diffracted light beam.

The manner in which the track 14 of disc 12 produces the beam diffraction patterns in FIGS. 3 and 4, will now be analyzed with the help of FIG. 5. Additionally, depth-of-focus considerations will also be discussed.

It will be assumed that the incoming beam is focused through the record track 14 to a point P which is located a distance $h$ away from the record (i.e., an out-of-focus condition). The modulation impressed on the record acts as a phasegrating having a spatial wavelength Λ, and, for small phase modulation index, causes a threefold splitting up of the incident bundle. This causes two additional foci $P_+$ and $P_-$ on either side of P. The angle $\theta$ between the central rays proceeding to P. and P (or $P_-$ and P) respectively is given by the well-known formula $$\sin\theta = \frac{\lambda}{\Lambda} \qquad (1)$$

where λ is the wavelength of the incident light. The separation b between $P_+$ and P (or $P_-$ and P) is approximately determined by the relation $$b = h\tan\theta \qquad (2)$$

If, for simplicity, we take the light amplitude to be unity at P, then the amplitudes at $P_+$ and $P_-$ are given by $$E(P_+) = -\tfrac{1}{2}\, ja\, exp[-jkh\,(1-\cos\theta) - j\psi] \qquad (3)$$

$$E(P_-) = -\tfrac{1}{2} ja\, exp[-jkh\,(1-\cos\theta) + j\psi] \qquad (4)$$

where $\psi$ is related to the phase of the record modulation with respect to the central ray of incident light, $a$ is the phase modulation index and $$k = \frac{2\pi}{\lambda}.$$

More specifically, if the phase modulation due to the record carrier is expressed as $$a\cos\left[\frac{2\pi}{\Lambda}(x - Vt) + a\right] \qquad (5)$$

then $$= a - \frac{2\pi}{\Lambda}Vt = a - \Omega t \qquad (6)$$

where V is the speed along the modulated groove. The far field of the light originating from the points $P_+$, P and $P_-$ may, in the overlap region of the three bundles, be described by $$E(p_+)exp(jkb\sin\gamma) + E(P) + E(P_-)\,exp(-jkb\sin\gamma) \qquad (7)$$

where $\gamma$ is the angle of observation.

With (3) and (4) we then find for the far field $$E(\gamma)\ \alpha -\tfrac{1}{2}\, ja\, exp[-jkh\,(1-\cos\theta) - j\psi + jkb\sin\gamma] + 1 - \tfrac{1}{2} ja\exp[-jkh\,(1-\cos\theta) + j\psi - jkb\sin\gamma] \qquad (8)$$

which may be written as $$E(\gamma)\alpha\ 1 - ja\, exp[-jkh\,(1-\cos\theta)]\cos(kb\sin\gamma - \psi) \qquad (9)$$

For small a the intensity $|E(\gamma)|^2$ in the far field may then be written $$|E(\gamma)|^2\ \alpha\ 1 \div 2a\sin[kh\,(1-\cos\theta]\cos(kb\sin\gamma - \psi) \qquad (10)$$

or, substituting (6), $$|E(\gamma)|^2\ \alpha\ 1 - 2a\sin[kh(1-\cos\theta)]\cos(kb\sin\gamma + \Omega t - a) \qquad (11)$$

The fringe patterns in the overlap field of $P_+$ and P, and of $P_-$ and P may be derived easily and are as follows $$|E(\gamma)|^2(\text{of } P_+ \text{ and } P) = 1 + a\sin[\Omega t + kb\sin\gamma - \alpha - kh\,(1-\cos\theta)] \qquad (12)$$

$$|E(\gamma)|^2\,(\text{of } P_- \text{ and } P) = 1 - a\sin[\Omega t + kb\sin\gamma - a + kh\,(1-\theta)]. \qquad (13)$$

Inspection of (11), (12) and (13) tells us the following

A. In general the far field is characterized by running fringes as expressed by the cosine term.

B. The fringe separation is given by $$kh(\sin\gamma_1-\sin\gamma_2) = 2\pi \qquad (14)$$

or $$(\sin\gamma_1-\sin\gamma_2) = \frac{\lambda}{b} = \frac{\lambda}{h\tan\theta} \qquad (15)$$

Hence the larger $h$, the more fringes will be seen in the overlap region.

C. In the region where all three orders overlap, the fringe contrast depends on the defocusing distance $h$; when $h$=o the fringes disappear for all Λ. Generally, the contrast is maximum whenever $$kh(1-\cos\theta) = (n+\tfrac{1}{2})\pi \qquad (16)$$

and minimum whenever $$kh(1-\cos\theta) = n\pi \qquad (17)$$

D. From (12) and (13) it can be seen that, where only two orders overlap, a change in $h$ (or Λ) affects the phase and wavelength of the fringes but not the contrast.

Thus, from (D) it follows that in regions near the edges of the zero order diffraction pattern (in the direction parallel to the track) a moving fringe pattern will always exist regardless of h. These regions are indicated by cross hatching in FIGS. 6*a* and 6*b* for the case of $2\Lambda > d$ and $2\Lambda < d$, respectively, where $d$ is the dimension of the spot in the direction of the track.

If an aperture is placed in the cross hatched region of FIG. 6*c* and the light passing through this aperture is collected by a photodiode, a time varying light signal will exist at the photodiode for all values of $h$ up to the point where one complete cycle of the fringe pattern fills the aperture width W (see FIG. 6*c*), where $$W = \frac{\lambda}{d}$$

and R is a constant always less than 0.5. Now one cycle of the fringe pattern (i.e., the fringe separation) subtends an angle given by (15). Substituting (1) into (15) gives $$\sin\gamma_1 - \sin\gamma_2 = \frac{\Lambda}{h}\cos\theta$$

For small angles $$\gamma_1-\gamma_2 = \Delta\gamma = \frac{\Lambda}{h} \qquad (18)$$

When this angle is equal to the angle subtended by the aperture (R λ/d) one fringe fills the aperture and the time varying light signal through the aperture goes to 0. This is when $$\frac{\Lambda}{h} \approx R\,\frac{\lambda}{d}$$

or $$h = \frac{d\Lambda}{R\lambda} \qquad (19)$$

This value of $h$ is the depth-of-focus for the system (the allowable defocus error). It can be seen that an increased depth-of-focus results when the aperture is made smaller, i.e., when R gets smaller. Since this results in a smaller fraction of the light reaching the photodiode, we see that a trade off exists between depth-of-focus and light signal.

As above noted, the aperture employed for controlling the light transmitted to the photodetector is described as comprising an elongated opening disposed perpendicular to the track. While an aperture having a rectangular slit readily conforms to this requirement, it is appreciated that apertures having other configurations are also suitable in practicing the invention. Specifically, the aperture 60 depicted in FIG. 7*a* comprises a triangular slit 62 in which the base $b$ is less than one-half the span of the zero order. In this embodiment the slit is oriented so that the altitude dimension is disposed perpendicular to track 14.

In like manner an aperture 64 comprising a trapezoidal opening 66 will also achieve the desired results so long as the longer dimension of the trapezoid is oriented perpendicular to the track, see FIG. 7*b*. This can be achieved by constructing the trapezoid so that, as illustrated, the distance between the parallel sides is greater than the distance between the non-parallel sides and then orienting the trapezoidal opening so that the parallel sides are disposed substantially parallel to track 14. In each of the exemplifications described herein, then, the criterion that must be satisfied is that the dimension of the aperture opening effectively parallel to the direction of the track must be less than one-half the distance across which the zero order is spread.

While particular embodiments of the invention have been shown and described, it will be obvious to those skilled in the art that changes and modifications may be made thereto without departing from the invention in its broader aspects and, therefore, the aim in the appended claims is to cover all such changes and modifications as fall within the true spirit and scope of the invention.

What is claimed is:

1. An optical system for detecting a time-varying signal spatially recorded upon a storage medium to form a light diffraction grating in the shape of an elongated track, said optical detection system comprising:

means for supporting said storage medium;

means for producing a beam of light;

means for focusing said beam to produce a reading spot for illuminating said track, said reading spot having a dimension in the longitudinal direction of said track which is less than the wavelength of the highest spatial frequency recorded upon said storage medium;

drive means for displacing said medium, relative to said spot, at a predetermined velocity to effect a scan of said track by said reading spot to develop a time-varying diffraction pattern of said spot, said pattern comprising at least a zero order, a +1 order and a −1 order with each of said orders having a distribution parallel to the longitudinal direction of said track, an aperture positioned in the far field of said diffraction pattern near the boundary of said zero order for transmitting at least a portion of said zero order diffraction pattern, said aperture comprising an opening having a dimension parallelling the longitudinal direction of said track which is less than one-half the distance across which said zero order is distributed; and light responsive means positioned adjacent said aperture for deriving, in response to illumination thereof by that portion of said time varying pattern transmitted by said aperture, an electrical signal representative of said time varying signal spatially recorded upon said medium.

2. An optical system as set forth in claim 1 in which said aperture is disposed in that region of the far field in which said zero order and one of said first orders overlap.

3. An optical system as set forth in claim 1 in which said aperture comprises an elongated slit disposed substantially perpendicular to said track.

4. An optical system as set forth in claim 1 in which said aperture comprises an opaque member having a rectangular opening and in which said opening is oriented so that its shorter dimension is disposed substantially parallel to said track.

5. An optical system as set forth in claim 1 in which said aperture comprises a trapezoidal opening in which the distance between the parallel sides of said opening is greater than the distance between the non-parallel sides and, in which said trapezoidal opening is oriented so that its parallel sides are disposed substantially parallel to said track.

6. An optical system as set forth in claim 1 in which said aperture comprises a triangular opening in which the altitude of the triangle is greater than its base and in which said triangular opening is oriented so that its altitude dimension is disposed substantially perpendicular to said track.

* * * * *